(12) United States Patent
Aadland

(10) Patent No.: US 12,736,407 B2
(45) Date of Patent: Sep. 15, 2026

(54) PYROMETERS

(71) Applicant: Rosemount Aerospace Inc., Burnsville, MN (US)

(72) Inventor: Tim Aadland, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 482 days.

(21) Appl. No.: 18/198,716

(22) Filed: May 17, 2023

(65) Prior Publication Data

US 2024/0167880 A1 May 23, 2024

Related U.S. Application Data

(60) Provisional application No. 63/426,831, filed on Nov. 21, 2022.

(51) Int. Cl.
*G01J 5/10* (2006.01)
*G01J 5/00* (2022.01)

(52) U.S. Cl.
CPC ............... *G01J 5/0088* (2013.01); *G01J 5/10* (2013.01)

(58) Field of Classification Search
None
See application file for complete search history.

(56) References Cited

U.S. PATENT DOCUMENTS 4,326,798 A 4/1982 Kahn
5,468,961 A * 11/1995 Gradon ............... A61M 16/161 250/343
6,799,137 B2 9/2004 Schietinger et al.
2008/0255769 A1* 10/2008 Zhou ................. G01N 21/3504 702/24
2010/0290045 A1* 11/2010 Saptari ................. G01N 21/314 356/326
2017/0314996 A1* 11/2017 Arlt ....................... G01J 5/0003
2018/0348059 A1 12/2018 Wang et al.
2022/0228923 A1 7/2022 Knobloch et al.

FOREIGN PATENT DOCUMENTS

CN 113310578 A 8/2021

OTHER PUBLICATIONS

Extended European Search Report dated Mar. 22, 2024; European Application No. 23210996.7.

(Continued)

*Primary Examiner* — Erica S Lin
(74) *Attorney, Agent, or Firm* — Suiter Swantz IP

(57) ABSTRACT

A pyrometer configured to sense thermal radiation within a volume (e.g., a turbomachine turbine or turbine engine) can include a photodiode configured to sense radiation at least within a desired infrared bandwidth and to output a photodiode signal, and an optical bandpass filter disposed in front of the photodiode to prevent radiation outside of the desired bandwidth from reaching the photodiode. The desired infrared bandwidth can be selected to be outside the absorption bands of one or more selected fluids such that the presence of one or more fluids (gasses) within the volume does not affect radiation that reaches the photodiode.

20 Claims, 8 Drawing Sheets

(56) References Cited

OTHER PUBLICATIONS

Ketui Daniel et al: "Single wavelength and ratio pyrometry reflection errors in temperature measurement of gas turbine blade", Measurement Institute of Measurement and Control. Londong, GB. vol. 86, Mar. 3, 2016, pp. 133-140.
European Patent Office, Examination Report received in EP Application No. 23210996.7, Aug. 20, 2025, 6 pages.
Mathews et al., "Extended performance GeSn/Si(100) p-i-n photodetectors for full spectral range telecommunication applications," Applied Physics Letters 95, 133506, Oct. 1, 2009, 3 pages.
Anonymous: "Hamamatsu InGaAs linear image sensors", Oct. 2021, pp. 1-11, XP093379350, Retrieved from the Internet: URL:https://www.hamamatsu.com/content/dam/hamamatsu-photonics/sites/documents/99_SALES_LIBRARY/ssd/g11508_etc_kmir1032e.pdf.
European Patent Office, Examination Report for EP Application No. 23210996.7 dated Mar. 26, 2026, 7 pages.

* cited by examiner

Ratio of Soot radiation to blade radiation across wavelength

PYROMETERS

CROSS-REFERENCE TO RELATED APPLICATIONS

This application claims priority to and the benefit of U.S. Provisional Application No. 63/426,831, filed Nov. 21, 2022, the entire contents of which are herein incorporated by reference in their entirety.

FIELD

This disclosure relates to pyrometers.

BACKGROUND

Traditionally, because of their high speed, non-contact, high temperature capability, pyrometers have been used, exclusively, to measure the temperature of turbine blades inside the combustion chambers in turbine engines. Such devices traditionally include a silicon detector to measure broadband radiation primarily in the visible to near infrared spectrum (e.g., within the combustion section of the turbine engine). Pyrometers are used to sense blackbody radiation which can be used to determine temperature. Traditional systems operate mostly in the visible spectrum. In modern engines, however, turbine engines run at much higher pressures and are becoming too hot for operation of a traditional pyrometer, and bright sparks can occur due to soot particles flying across the pyrometer's field of view which causes a sudden spike in the pyrometer's output signal. These spikes in output could be interpreted as a false increase in temperature of a turbine blade. Previous attempts at designing pyrometers that are more resilient to the false high temperature spike caused by sparks have led only to devices that drift with ambient temperature and, therefore, are unusable.

Such conventional methods and systems have generally been considered satisfactory for their intended purpose. However, there is still a need in the art for improved pyrometers. The present disclosure provides a solution for this need.

SUMMARY

A pyrometer configured to sense thermal radiation within a volume (e.g., the temperature of turbine blades within a combustion cavity of a turbine engine) can include a photodiode configured to sense radiation at least within a desired infrared bandwidth and to output a photodiode signal (e.g., current that is directly proportional to said radiation), and an optical bandpass filter positioned in front of the photodiode to prevent radiation outside of the desired bandwidth from reaching the photodiode (e.g., an active area thereof). The desired infrared bandwidth can be selected to be outside the absorption bands of one or more selected fluids (e.g., all internal gasses and/or liquids) such that the presence of the one or more selected fluids within the volume does not affect radiation that reaches the photodiode.

The one or more fluids can include carbon dioxide ($CO_2$) and water ($H_2O$), for example. The desired infrared bandwidth can have a center wavelength of about 1625 nm (e.g., which is a wavelength that is unaffected by fluid absorption characteristics of water and $CO_2$). The desired infrared bandwidth can be wavelengths between (e.g., and including) about 1575 nm to about 1675 nm. In certain embodiments, the photodiode is an InGaAs photodiode.

In certain embodiments, the optical bandpass filter's bandwidth can be 100 nm wide and configured to pass wavelengths between 1575 nm and 1675 nm (e.g., plus or minus 10 nanometers), for example. In certain embodiments, the photodiode can be configured such that its responsivity drifts less than a drift amount over an operational temperature range of about −55° C. to about 125° C. ambient temperature and about 1000° F. to about 2100° F. blackbody temperature such that a cutoff wavelength of the photodiode does not drift into the optical bandpass filter's bandwidth. The bandpass filter can be configured to have a bandwidth of 100 nm±10 nm and a center wavelength drift amount less than or equal to 1 nm (e.g., over the entire temperature range). The pyrometer can include an op amp operatively connected to the photodiode to receive the photodiode signals and configured to output one or more sensor signals. The op amp can be chopper stabilized to prevent drift over the operating temperature range. In certain embodiments, the op amp can include a maximum input offset voltage of about 6.5 microvolts over the entire operating temperature range. In certain embodiments, the op amp can include a maximum input offset current of about 500 picoamps over the entire operating temperature range.

In certain embodiments, the op amp can include a maximum input bias of about 2000 picoamps over the operating temperature range. In certain embodiments, the op amp includes an input offset voltage drift from about 2.5 nanovolts per degree C. to about a maximum of less than 15 nanovolts per degree C.

In accordance with at least one aspect of this disclosure, a pyrometer (e.g., as disclosed above), a bandpass filter (e.g., as disclosed above) where the desired infrared bandwidth is selected to be outside the absorption bands of $CO_2$ and $H_2O$ such that the presence of $CO_2$ and $H_2O$ within the volume (e.g., within pyrometer's field of view) does not affect radiation that reaches the photodiode, and a chopper stabilized op amp, e.g., as disclosed above, operatively connected to the photodiode to receive the photodiode signals and configured to output one or more sensor signals. The pyrometer can be similar as the pyrometer disclosed above in certain embodiments.

In accordance with at least one aspect of this disclosure, a method can include sensing blackbody radiation being emitted from the turbine blades of a turbine engine outside any bandwidths that correspond to any absorption bands of $CO_2$ and $H_2O$, and determining a turbine blade temperature based on the sensed blackbody radiation. The method can include sensing blackbody radiation between about 1575 nm and about 1675 nm. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
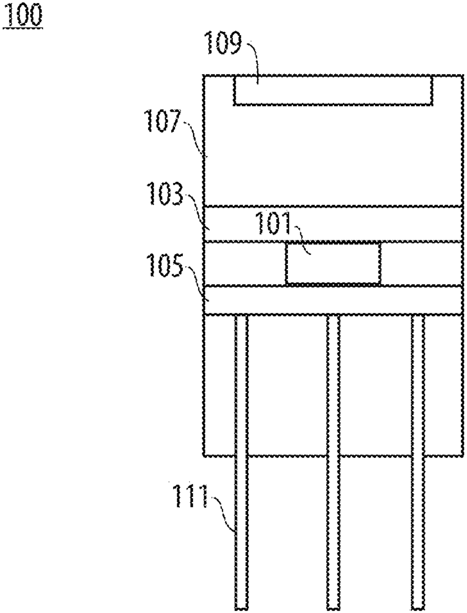
FIG. 1 is a cross-section schematic view of an embodiment of a pyrometer in accordance with this disclosure.

Reference will now be made to the drawings wherein like reference numerals identify similar structural features or aspects of the subject disclosure. For purposes of explanation and illustration, and not limitation, an illustrative view of an embodiment of a pyrometer in accordance with the disclosure is shown in FIG. 1 and is designated generally by reference character 100. Other embodiments and/or aspects of this disclosure are shown in FIGS. 1A-5.

Figure 1A:
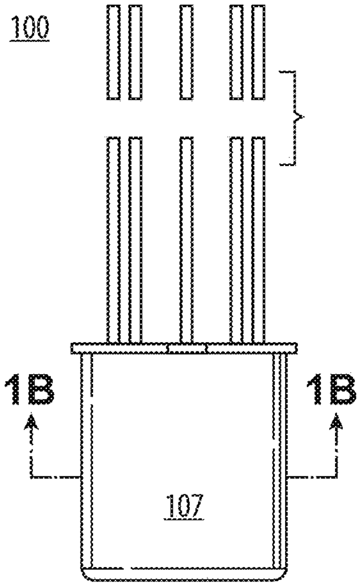
FIG. 1A is an elevation side view of the embodiment of FIG. 1.
Figure 1B:
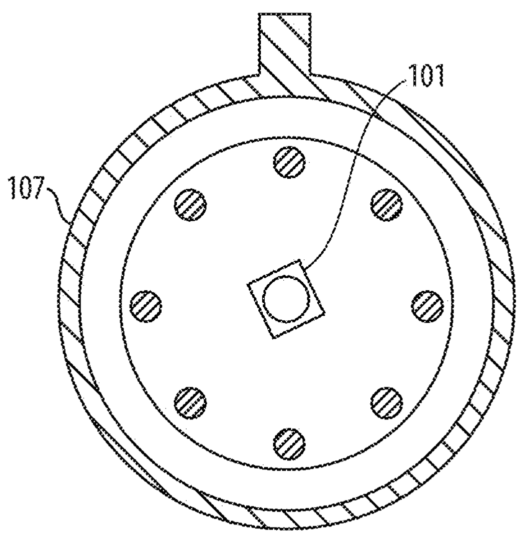
FIG. 1B is a cross-sectional top view of the embodiment of FIG. 1A along line E-E, showing a photodiode and not showing an optical filter (e.g., since the optical filter would appear opaque and obscure the view of the components lying below)
Figure 1C:
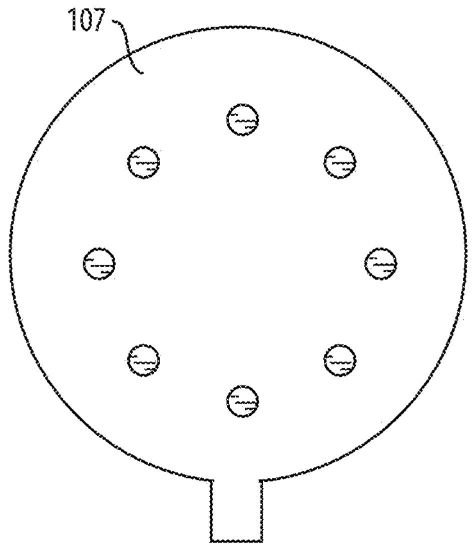
FIG. 1C is a bottom view of the embodiment of FIG. 1A, showing an embodiment of pin placement and function.

Referring to FIGS. 1-1C, a pyrometer 100 configured to sense thermal radiation within a volume (e.g., blackbody radiation of a turbine engine's turbine blades within a volume of a turbomachine) can include a photodiode 101 (e.g., a photodetector) configured to sense radiation at least within a desired infrared bandwidth and to output a photodiode signal (e.g., a voltage indicative of blackbody radiated intensity). The photodiode 101 can be of any suitable size and shape large enough to encompass all the radiation from the pyrometer's optical path (e.g., 0.040 inches or 1 mm active area having a circular shape).

The pyrometer 100 can also include a bandpass filter 103 disposed in front of the photodiode 101 to prevent radiation outside of the desired bandwidth from reaching the photodiode 101. The desired infrared bandwidth can be selected to be outside the absorption bands of all selected liquids, gasses (vaporized elements) such that the presence of one or more elements/compounds within the volume does not absorb (affect) radiation that reaches the photodiode 101. The pyrometer 100 can include an op amp 105 operatively connected to the photodiode 101 to receive the photodiode signals and configured to output one or more sensor signals.

The photodiode 101, bandpass filter 103, and the op amp 105 can be enclosed within a housing 107 (e.g., TO-5 or similar). The housing 107 can include a window 109 (e.g., comprised of bandpass filter elements coated on borosilicate glass or opening). In certain embodiments, the window 109 can have the bandpass filter 103 disposed thereon or over the window 109. Any suitable placement of the bandpass filter 103 to block undesired radiation to the photodiode 101 is contemplated herein. The pyrometer 100 can include a plurality of pins 111 (e.g., eight as shown, six, or other suitable number) connected to the op amp 105. For example, FIG. 1C shows an embodiment of pin functions, wherein six pins 111 (e.g., pins 2, 3, 4, 6, 7, and 8) are in use.

In certain embodiments, the one or more liquid or gaseous elements that define the absorption bands can be or include $CO_2$ and $H_2O$, for example (e.g., fluids, gasses and/or liquids common within a turbine engine). Any other suitable fluids are contemplated herein for any other suitable application.

In certain embodiments, the desired infrared bandwidth can have a center wavelength of about 1625 nm. The desired infrared bandwidth can be wavelengths between (e.g., and including) about 1575 nm to about 1675 nm. In certain embodiments, the photodiode 101 is an InGaAs photodiode.

In certain embodiments, the bandpass filter 103 can be a 100 nm bandwidth filter configured to pass wavelengths between 1575 nm and 1675 nm, for example. In certain embodiments, the photodiode 101 can be configured such that responsivity drifts less than a drift amount over an operational temperature range of about −55° C. to about 125° C. ambient temperature and about 1000° F. to about 2100° F. radiated blackbody temperature such that a cutoff wavelength of the photodiode 101 does not drift into the desired infrared bandwidth defined by the optical bandpass filter. The bandpass filter 103 can be configured to have a bandwidth of 100 nm±10 nm and a center wavelength drift amount less than or equal to 1 nm shift in center wavelength (e.g., over the above noted temperature ranges). Certain embodiments of a bandpass filter 103 can be obtained from Evaporated Coatings Inc. of 2365 Maryland Rd, Willow Grove, PA 19090.

In certain embodiments, the op amp 105 can be chopper stabilized to prevent drift over the operating temperature range (e.g., as disclosed above). In certain embodiments, the op amp 105 can include a maximum input offset voltage of about 6.5 microvolts over the operating temperature range. In certain embodiments, the op amp 105 can include a maximum input offset current of about 500 picoamps over the operating temperature range, or a maximum input bias of about 2000 picoamps over the operating temperature range. In certain embodiments, the op amp includes an input offset voltage drift of about 2.5 nanovolts per degree C. to about 15 nanovolts per degree C.

Figure 2:
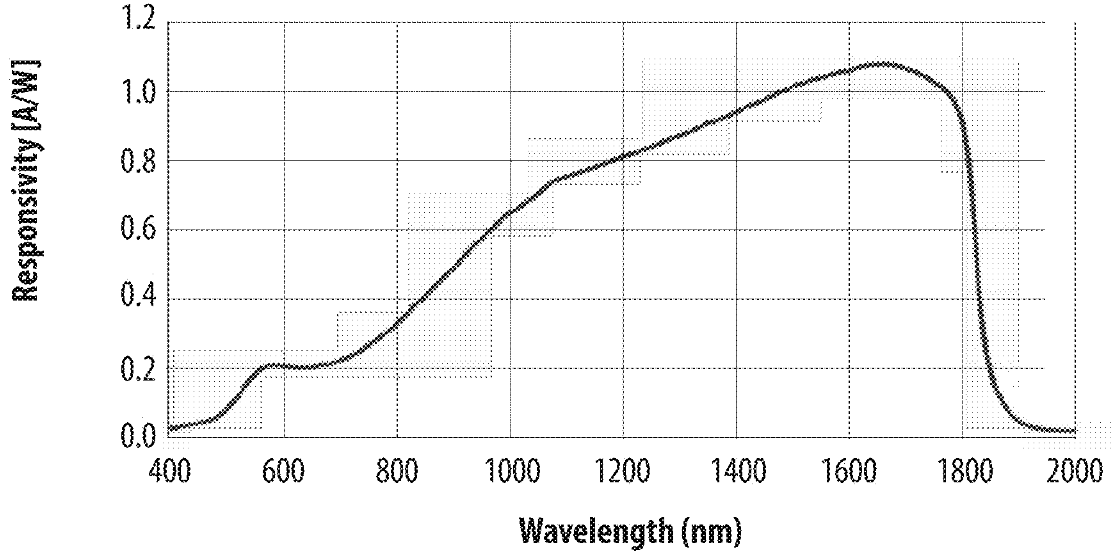
FIG. 2 is a graph showing a responsivity curve at 25 C of an embodiment of an InGaAs photodiode in accordance with this disclosure.
Figure 3:
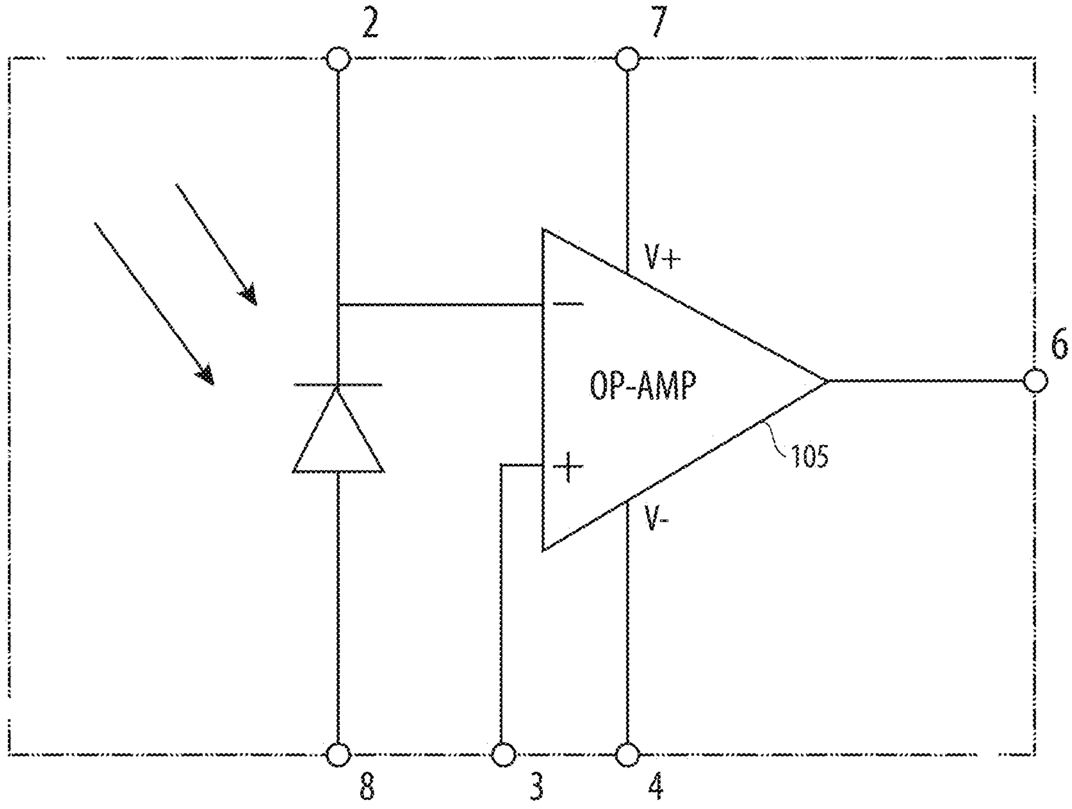
FIG. 3 is an electrical schematic diagram of an embodiment of a photodiode electrically connected to an op amp in accordance with this disclosure.
Figure 4:
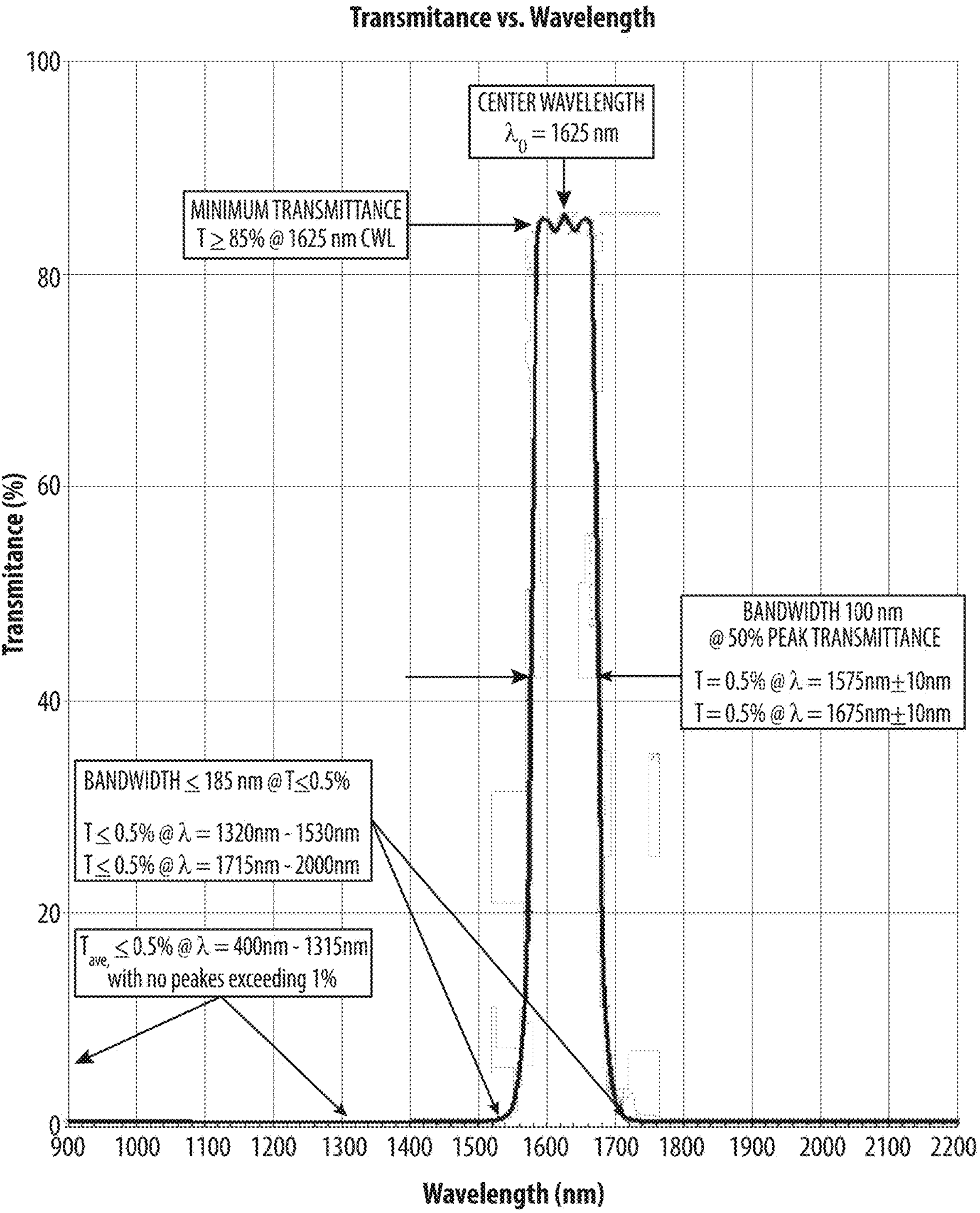
FIG. 4 is a graph showing bandpass filter transmittance vs. wavelength for an embodiment of bandpass filter in accordance with this disclosure.
Figure 5:
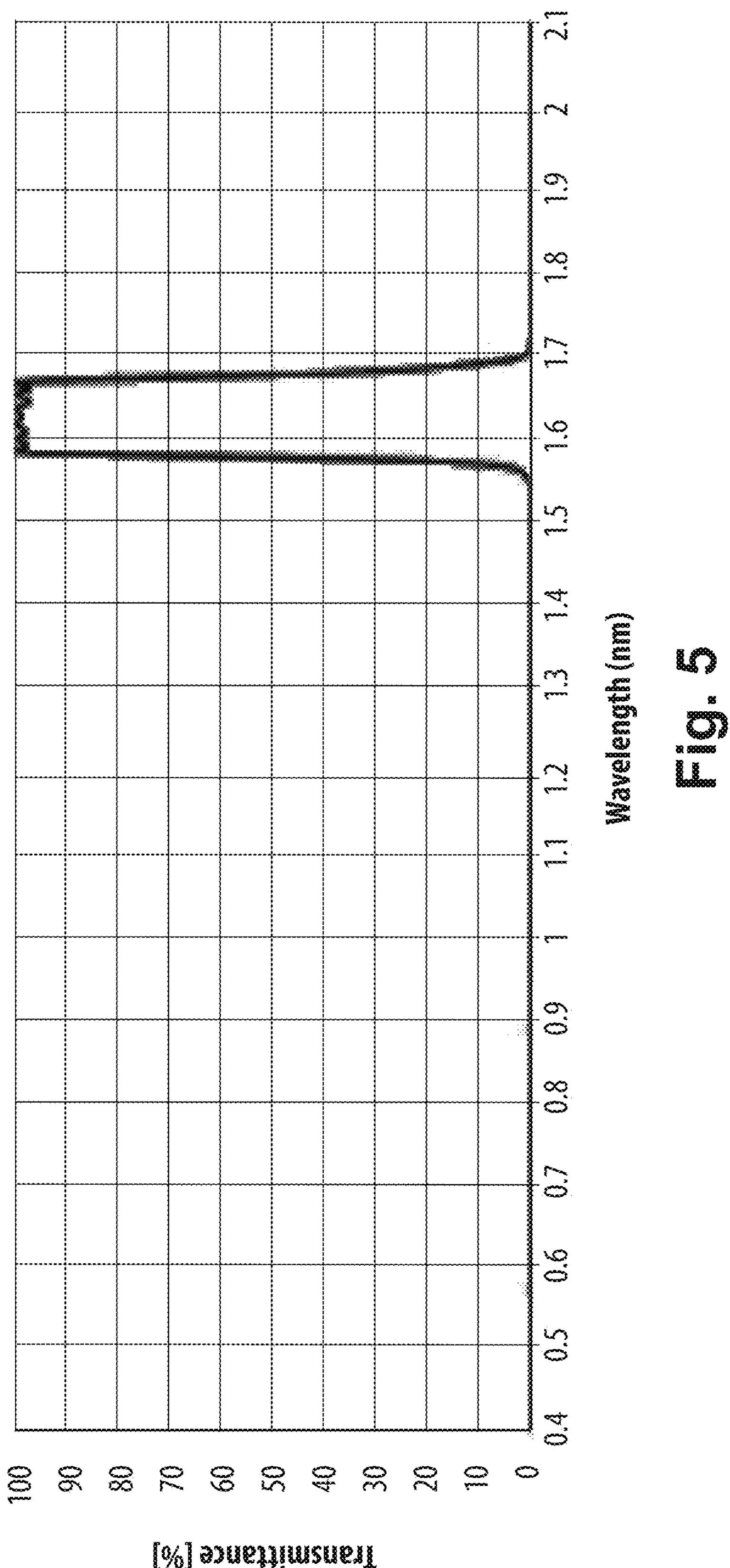
FIG. 5 shows expected InGaAs detector/bandpass filter responsivity vs. wavelength for the embodiment of FIG. 4.

Referring to FIG. 2, a responsivity curve of an embodiment of an InGaAs photodiode 101 is shown vs. wavelength, showing a cutoff wavelength around 1750 nm to 1800 nm at which point the curve drops off. FIG. 3 shows an electrical diagram of an embodiment of the op amp 105, for example, including pin numbers 2, 3, 4, 6, 7, and 8 to match with FIG. 1C. FIG. 4 shows transmittance vs. wavelength of an embodiment of the bandpass filter 103 (e.g., T=50% at 1575 nm±10 nm and at 1675 nm±10 nm), and FIG. 5 shows expected transmittance.

Figure 6:
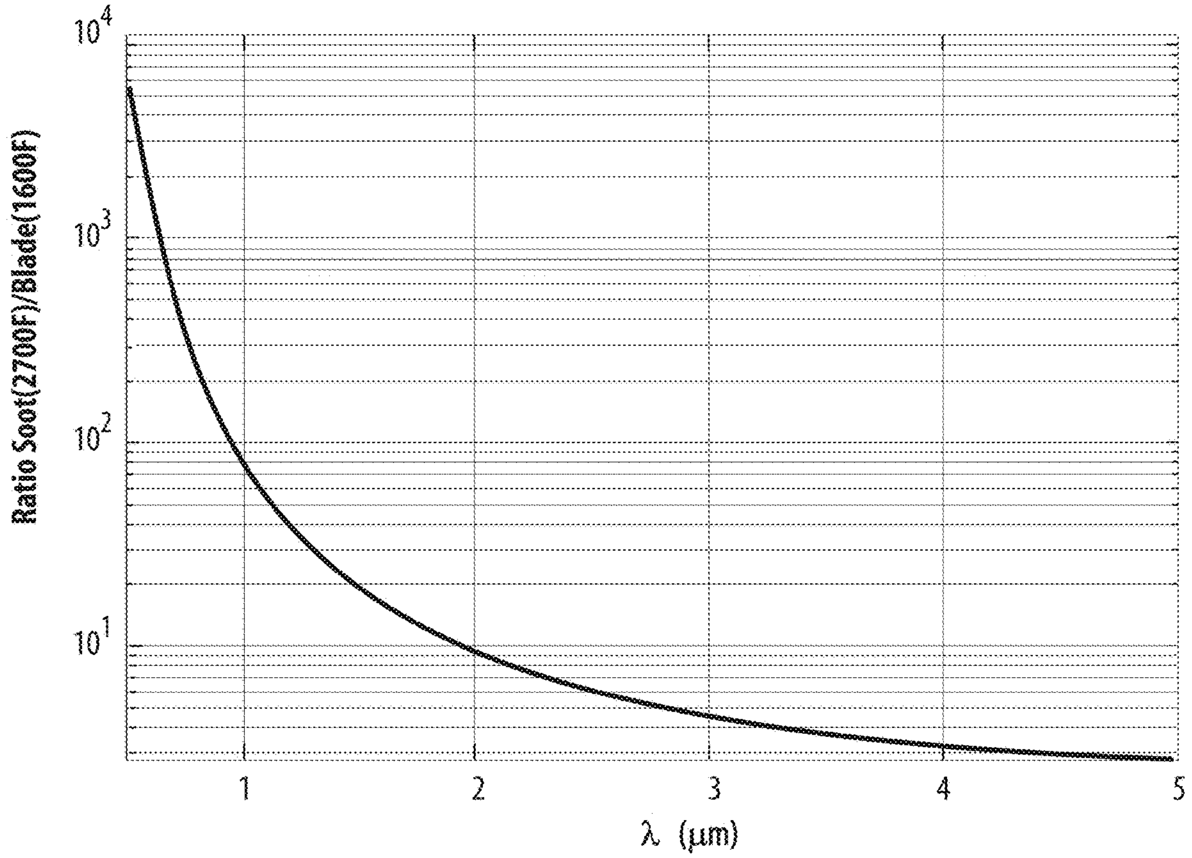
FIG. 6 is a chart showing a ration of soot radiation to blade radiation as a function of wavelength.
Figure 7:
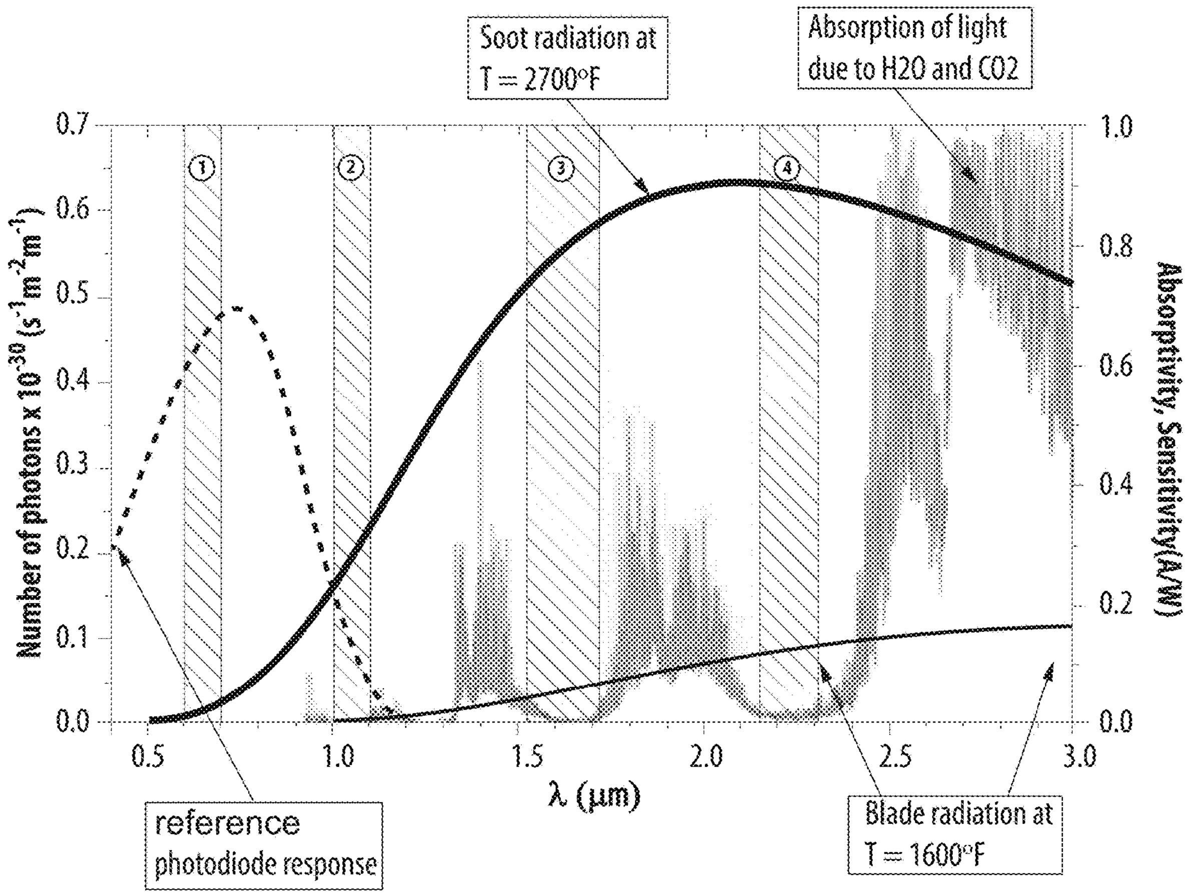
FIG. 7 is a chart that illustrates strength of radiation as a function of wavelength, as well as the absorption of radiation by $CO_2$ and $H_2O$.

FIG. 6 shows that the signal-to-noise ratio between a pyrometer's desired turbine blade signal and the pyrometer's undesired signal due to soot particle radiation increases as the measurement wavelength increases, for example. FIG. 7 shows zones best for measurement. The peaks of $CO_2$ and $H_2O$ absorption line are in these zones avoided. Zones 1 through 4 are wavelengths of interest because water vapor and $CO_2$ have little influence at these wavelengths. However, Zones 1 and 2 are not ideal because noise from sparks seriously outweighs the signal from the blades as shown by the red curve. Zone 3 is an acceptable band because there is significantly more energy being radiated by the turbine blade in this region, as shown by the blade radiation curve, for example. The blade radiation curve and the soot radiation curve show that, as wavelength increases, the signal-to-noise ratios between turbine radiation and unwanted soot radiation increases with wavelength.

Table 1 below shows an embodiment of parameters for an embodiment of an op amp 105 in accordance with this disclosure. One or more embodiments of an op amp 105 with suitable characteristics can be obtained from Analog Devices of One Analog Way Wilmington, MA 01887 (e.g., chip number ADA884522).

TABLE 1

| PARAMETER | SYMBOL | TEST CONDITIONS −40° C. ≤ $T_A$ ≤ +125° C. V+ = 5 V, V- = 0 V (UNLESS OTHERWISE SPECIFIED) | ADA4522-2 SPECIFICATION LIMITS TYP | MAX | UNITS |
|---|---|---|---|---|---|
| SUPPLY CURRENT | $I_S$ | TA = −40° C. to 125° C. Vcc = +5.5 V, $I_{out}$ = 0 mA | | 950 | μA |
| INPUT OFFSET VOLTAGE * | $V_{OS}$ | V+ = 5 V $V^-$ = −5 V for ADA4522-2 | | 6.5 | μV |
| INPUT OFFSET VOLTAGE DRIFT | $TCV_{OS}$ | AVERAGE DRIFT | 2.5 | 15 | nV/° C. |
| INPUT BIAS CURRENT* | $I_B$ | | | 2000 | pA |
| GAIN BANDWIDTH PRODUCT* | GBP | $R_L$ = 10 kΩ, CL = 50 pF, $V_{IN}$ = 10 mV, $A_V$ = 100 | 2.7 | | MHz |
| SLEW RATE | SR | Vcc = 5 V, CL = 50 pF, Vout = 2 V step, $A_V$ = 1 | 1.4 | | V/μS |
| INPUT OFFSET CURRENT* | $I_{OS}$ | V+ = 5 V $V^-$ = 0 V | | 500 | pA |
| INPUT VOLTAGE NOISE DENSITY | $e_n$ | F = 1 kHz Av = 100 for ADA4522-2 | 5.8 | | $nV/(Hz)^{1/2}$ |
| INPUT CURRENT NOISE DENSITY | $i_n$ | F = 1 KHz | 0.8 | | $fA/(Hz)^{1/2}$ |

Table 2 below shows an embodiment of maximum ratings for an embodiment of the pyrometer 100.

TABLE 2

| PARAMETER | ANALOG DEVICES ADA4522-2 LIMITS | UNITS |
|---|---|---|
| SUPPLY VOLTAGE (v+ TO v−) | 60.0 | VOLTS |
| VOLTAGE AT INPUT PIN | (V+)+0.3 V, (V−)−0.3 V | VOLTS |
| DIFFERENTIAL INPUT VOLTAGE | ±5 V | VOLTS |

TABLE 2-continued

| PARAMETER | ANALOG DEVICES ADA4522-2 LIMITS | UNITS |
|---|---|---|
| JONCTION TEMPERATURE | −65 TO +150 | ° C. |
| STORAGE TEMPERATURE | −65 TO +150 | ° C. |

Table 3 below shows an embodiment of electrical performance characteristics of an embodiment of a photodiode 101. One or more embodiments of a photodiode 101 with suitable characteristics can be obtained from Masimo Semiconductor of 25 Sagamore Park Rd, Hudson, NH 03051.

TABLE 3

| PARAMETER | CONDITIONS | MIN | MAX | UNITS |
|---|---|---|---|---|
| RESPONSIVITY (A/W) Ta = 22° C. λ = 1625 nm | 1625 nm, BIAS 0 V | 0.95 | 1.05[(1)] | A/W |
| JUNCTION CAPACITANCE ($C_j$) | T = 22° C. V = 0.0 V BIAS | 220[(1)] | 300 | pF |
| | T = 125° C. V = 0. 0 V BIAS | 470[(1)] | 500 | |
| SHUNT RESISTANCE $R_{SH}$ | T = 22° C. 10 mV BIAS | 425 | 1000[(1)] | KΩ |
| | T = 125° C., 10 mV BIAS | 3.30[(2)] | 9.33[(1)] | |
| NEP @ 1625 nm @22° C. ± 2° C. | V = 10 mV | | 2E−13 | $W/(Hz)^{1/2}$ |
| PEAK RESPONSIVITY WAVELENGTH | T = 22° C. | 1600 | 1700 | nm |
| 50% CUTOFF WAVELENGTH | T = 22° C. | 1830 | 1870 | nm |
| FORWARD VOLTAGE $V_F$ | ImA BIAS | 0.45 TYP | 0.70 | V |

TABLE 3-continued

| PARAMETER | CONDITIONS | MIN | MAX | UNITS |
|---|---|---|---|---|
| DRIFT | −55° C. to 125° C. In Functional Test Fixture while illuminated to ≥2 VDC output | | 100(2) | mV |

Certain embodiments include all characteristics of the above tables. Certain embodiments can be a turbine pyrometer configured for use in a gas turbine engine, and can greatly reduce the negative effects of hot soot particles and ignore the radiated Infra-Red absorption effects of added water vapor or $CO_2$ on a temperature reading.

In accordance with at least one aspect of this disclosure, a pyrometer (e.g., pyrometer 100 as disclosed above), a bandpass filter (e.g., as disclosed above) where the desired infrared bandwidth is selected to exclude the absorption bands of carbon dioxide and $H_2O$ such that the presence of carbon dioxide and $H_2O$ within the volume does not affect radiation that reaches the photodiode, and a chopper stabilized op amp, e.g., as disclosed above, operatively connected to the photodiode to receive the photodiode signals and configured to output one or more sensor signals. The pyrometer can be similar as the pyrometer disclosed above in certain embodiments.

In accordance with at least one aspect of this disclosure, being emitted from the turbine blades of a turbine engine outside any bandwidths that correspond to any absorption bands of certain compounds. For example, the method can include sensing blackbody radiation within turbine engine's combustion chamber only in a bandwidth that excludes the absorption bands of $CO_2$ and $H_2O$, and determining a turbine engine's turbine blade temperature based on the sensed radiation. The method can include sensing radiation includes detecting radiation between about 1575 nm and about 1675 nm. The method can include any other suitable method(s) and/or portion(s) thereof.

It has been determined that measuring temperature of turbine blades in a turbine engine combustor volume using higher wavelengths than visual wavelengths achieve a better signal to noise ratio (e.g., optical turbine blade temperature signal to optical hot spark temperature signal). The further into IR wavelengths, the better signal to noise ratio. However, most IR wavelengths are more sensitive to the presence of $CO_2$ and $H_2O$ and are unsuitable due to the unstable transmittance of IR radiance in the $CO_2$ and $H_2O$ absorptions bands. Accordingly, it has been discovered that only a very narrow band of IR (e.g., centered around 1625 nm) works well for aircraft turbomachine applications which can experience large amounts of $CO_2$ and $H_2O$ in use. Such a band corresponds to the absence of $CO_2$ and $H_2O$ water vapor absorption bands.

Embodiments can include a high-order bandpass filter with steep slopes that are only 50 nm from the center wavelength. Embodiments can include a photodiode that is extremely efficient to extract all the important energy in the limited bandpass. Embodiments of a bandpass filter can have virtually no drift (e.g., only about 1 nm over the temperature range of −55° C. to 125° C. ambient, while accurately measuring 1000° F.-2100° F. turbine blade blackbody temperature), whereas traditional systems drift hundreds of nanometers due to extreme ambient temperature requirements. Embodiments can also include an InGaAs photodetector having specific responsivity and drift characteristics that prevent its cutoff wavelength from interacting with the bandpass filter's transmittance curve (e.g., 1575 nm-1675 nm) over the above specified temperature range. The sensor can be designed (e.g., with custom doping) to not allow its cutoff wavelength from interacting with the bandpass filter's transmittance curve such that the any drift over temperature is always outside of the bandpass filter's transmittance curve. Embodiments can include a transimpedance amplifier (an op amp) that takes a current from the photodiode and converts it to voltage. Embodiments can be chopper stabilized to prevent drift. It was discovered that with an InGaAs photodetector, an op amp with extremely low offset voltage, e.g., in the picoamp range, would be beneficial due to the low shunt resistance exhibited by the InGaAs photodiode that varies significantly with temperature. Embodiments can include a semi-digital (e.g., chopper stabilized) op amp that chops the current and changes input offset voltage based on measured currents at the op-amp's inputs compared to reference currents.

The normal continuous operating conditions of certain embodiments can include ambient temperature of −65° F. (−54° C.) to 250 F (121° C.) and an ambient pressure of 0.5 to 23 psia. The absolute maximum soak temperature after engine shut-down of certain embodiments can be 300° F. (149° C.). Embodiments can be packaged with the optical window/bandpass filter, the InGaAs detector, and the operational amplifier inside an extended-length TO-5 package, e.g., as shown in FIG. 1A, with a minimum of 1 inch length leads.

Embodiments can include a hybrid photodetector that uses a ceramic circuit board with gold traces. Opaque epoxy paint, mask and/or other techniques can be employed to eliminate stray radiation from striking the operational amplifier die as transistors within the die may be greatly affected as photons strike p-n junctions due to incident light. All circuit interconnects can use either gold (Au) or aluminum-silicon (AlSi) wire-bonds on a ceramic circuit board. The circuitry can be wire-bonded to the TO-5 pins in accordance to the Figures disclosed herein. In certain embodiments, the insulation resistance between all pins and the case can exceed 100 mega-ohms with 100 vdc applied.

The optical bandpass filter can have a first surface with T>85% at a center wavelength of 1625 nm, a 100 nm±10 nm bandwidth at T50% peak transmittance, T=50% at a wavelength of 1575 nm±10 nm, T=50% at a wavelength of 1675 nm±10 nm, T<0.5% at a wavelength of 1320 nm-1530 nm and 1715 nm-2000 nm, Tavg<0.5% at a wavelength of 400 nm-1315 nm with no peaks exceeding 1%, angle of incidence (AOI) of 0, and an air boundary. The optical bandpass filter can have an uncoated second side.

Embodiments can provide a hybrid detector assembly that can meet a periodic ambient temperature minimum of −65° F. (−54° C.) and a maximum of +250° F. (+121° C.) with no damage or permanent degradation of performance. The hybrid detector assembly can be configured to withstand the following forced vibration and acceleration in Table 4 continuously without degradation or exhibiting an AC output that exceeds 2 mV peak to peak at frequencies greater than 1 kHz.

TABLE 5

| AMPLITUDE | FREQUENCY |
|---|---|
| 0.040 INCH D.A. | 10-100 Hz |
| 48 G's PEAK | 100-5000 Hz |

The maximum sinusoidal sweep rate can be 1 octave per minute. The entire frequency range 10 to 5000 to 10 Hz can be performed three (3) times in each orientation (x, y and z axis).

Embodiments of the hybrid detector assembly can be configured to withstand a constant acceleration per MIL-STD-883, method 2001 (5000 G's) in the y direction (perpendicular to window) for one (1) minute minimum. The hybrid detector assembly can be hermetically sealed which can be verified by passing a leak-seal test per MIL-STD-883, method 1014 (1 e-06 scc/sec helium).

Embodiments can include a hybrid InGaAs 1625 nm photodetector sensor for pyrometric temperature measurement. Embodiments can include a new high wavelength pyrometer, which can be a sensor used to measure high pressure turbine blade surface metal temperature. A higher wavelength pyrometer can be useful for a better signal to noise ratio, i.e., to detect more turbine blade radiation compared to soot radiation. Embodiments can include three main components, the InGaAs photodiode, a transimpedance op-amp, and an optical bandpass filter. The InGaAs photodiode can be an extended InGaAs with high shunt resistance at high temperature. The op-amp can be chopper stabilized and can exhibit ultra-low input offset voltage and drift. The optical bandpass filter can be a narrow filter (e.g., 100 nm) configured to detect wavelengths to avoid radiation affected by water vapor and $CO_2$. This bandpass filter can be designed to be stable over temperature and humidity (e.g., less than 1 nm drift). Embodiments can be configured to attenuate unwanted radiation caused by soot particles, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A pyrometer configured to sense thermal radiation within a volume, comprising:

a photodiode configured to sense radiation at least within a desired infrared bandwidth and to output a photodiode signal; and a bandpass filter disposed in front of the photodiode to prevent radiation outside of the desired bandwidth from reaching the photodiode, wherein the desired infrared bandwidth is selected to be outside the absorption band of one or more selected fluids such that the presence of one or more fluids within the volume does not affect radiation that reaches the photodiode, wherein the photodiode is doped to prevent a cutoff wavelength of the photodiode interacting with a transmittance curve of the bandpass filter such that any drift over temperature is outside of the transmittance curve of the bandpass filter.

2. The pyrometer of claim 1, wherein the one or more fluids include $CO_2$ and $H_2O$.

3. The pyrometer of claim 2, wherein the desired infrared bandwidth has a center wavelength of about 1625 nm.

4. The pyrometer of claim 3, wherein the desired infrared bandwidth are wavelengths between about 1575 nm to about 1675 nm.

5. The pyrometer of claim 4, wherein the photodiode is an InGaAs photodiode.

6. The pyrometer of claim 5, wherein the bandpass filter is a 100 nm filter configured to pass wavelengths between 1575 nm and 1675 nm.

7. The pyrometer of claim 6, wherein the bandpass filter can be configured to have a bandwidth of 100 nm±10 nm and a center wavelength drift amount less than or equal to 1 nm.

8. The pyrometer of claim 7, wherein the photodiode can be configured such that responsivity drifts less than a drift amount over an operational temperature range of about −55° C. to about 125° C. ambient temperature or about 1000° F. to about 2100° F. blackbody temperature such that a cutoff wavelength of the photodiode does not drift into the desired infrared bandwidth.

9. The pyrometer of claim 8, further comprising an op amp operatively connected to the photodiode to receive the photodiode signals and configured to output one or more sensor signals.

10. The pyrometer of claim 9, wherein the op amp is chopper stabilized to prevent drift over the operating temperature range.

11. The pyrometer of claim 10, wherein the op amp includes a maximum input offset voltage of about 6.5 microvolts over the operating temperature range.

12. The pyrometer of claim 11, wherein the op amp includes a maximum input offset current of about 500 picoamps over the operating temperature range.

13. The pyrometer of claim 12, wherein the op amp includes a maximum input bias current of about 2000 picoamps over the operating temperature range.

14. The pyrometer of claim 13, wherein the op amp includes an input offset voltage drift of about 2.5 nanovolts per degree C. to about 15 nanovolts per degree C.

15. A pyrometer configured to sense thermal radiation within a volume, comprising:

a photodiode configured to sense radiation at least within a desired infrared bandwidth and to output a photodiode signal directly proportional to the sensed radiation;

a bandpass filter disposed in front of the photodiode to prevent radiation outside of the desired bandwidth from reaching the photodiode, wherein the desired infrared bandwidth is selected to be outside the absorption band of one or more selected fluids, wherein the one or more selected fluids are at least carbon dioxide and H2O such that the presence of one or more fluids within the volume does not affect radiation that reaches the photodiode, wherein the photodiode is doped to prevent a cutoff wavelength of the photodiode interacting with a transmittance curve of the bandpass filter such that any drift over temperature is outside of the transmittance curve of the bandpass filter; and a chopper stabilized op amp operatively connected to the photodiode to receive the photodiode signals and configured to output one or more sensor signals.

16. The pyrometer of claim 15, wherein the desired infrared bandwidth has a center wavelength of about 1625 nm.

17. The pyrometer of claim 16, wherein the desired infrared bandwidth is wavelengths between about 1575 nm to about 1675 nm.

18. The pyrometer of claim 17, wherein the photodiode is an InGaAs photodiode.

19. A method, comprising:

providing a pyrometer configured to sense thermal radiation within a volume, comprising:

a photodiode configured to sense radiation at least within a desired infrared bandwidth and to output a photodiode signal; and a bandpass filter disposed in front of the photodiode to prevent radiation outside of the desired bandwidth from reaching the photodiode, wherein the desired infrared bandwidth is selected to be outside the absorption band of one or more selected fluids such that the presence of one or more fluids within the volume does not affect radiation that reaches the photodiode, wherein the photodiode is doped to prevent a cutoff wavelength of the photodiode interacting with a transmittance curve of the bandpass filter such that any drift over temperature is outside of the transmittance curve of the bandpass filter;

sensing the radiation being emitted from a turbine blade of a turbine engine outside any bandwidths that correspond to any absorption bands of CO2 and H2O; and determining a turbine blade temperature based on the sensed radiation.

20. The method of claim 19, wherein sensing radiation includes detecting radiation between about 1575 nm and about 1675 nm.

* * * * *